United States Patent [19]
Klementi et al.

[11] 3,926,589
[45] Dec. 16, 1975

[54] DEVICE AND METHOD FOR SEPARATION OF FLUID MIXTURE INTO FRACTIONS IN A CHROMATOGRAPH

[76] Inventors: Toe Jokhannesovich Klementi, ulitsa Pukhkekodu tee, 46, kv. 1; Henn-Jaak Eerovich Herem, ulitsa Ekhte, 3, kv. 14, both of Tallin; Eduard Petrovich Skornyakov, Kronshtadsky bulvar, 49, kv. 66, Moscow, all of U.S.S.R.

[22] Filed: Dec. 21, 1973

[21] Appl. No.: 427,409

[52] U.S. Cl. .................................. 55/67; 55/197
[51] Int. Cl.² ................................. B01D 15/08
[58] Field of Search ....................... 55/197, 67

[56] References Cited
UNITED STATES PATENTS

| | | | |
|---|---|---|---|
| 3,220,164 | 11/1965 | Golay | 55/197 X |
| 3,225,521 | 12/1965 | Burow | 55/197 X |
| 3,698,156 | 10/1972 | Dirian | 55/67 |

*Primary Examiner*—John Adee
*Attorney, Agent, or Firm*—Haseltine, Lake & Waters

[57] ABSTRACT

The device comprises three groups of separating columns connected to three groups of switching devices which accordingly connect; gas inlets of the device with inlets of groups of columns, inlets and outlets of groups of columns together and with the mixture inlet device, and outlets of groups of columns with outlet paths for collection of separated fractions.

In the said device a method of continuous separation of fluid mixtures of substances is realized in the method being characterized by the shift of inlet and outlet points of gas flows and by taking of separated fractions of the mixture of the ends of the chromatographic band, the taking of heavy fractions from the end of the chromatographic band being effected by a separate gas flow.

1 Claim, 11 Drawing Figures

DEVICE AND METHOD FOR SEPARATION OF FLUID MIXTURE INTO FRACTIONS IN A CHROMATOGRAPH

The present invention relates to devices and methods of chromatographic separation of fluid mixtures and can be employed, for instance, for obtaining pure materials an a semi-industrial scale. Known in the art is a semi-continuous method of chromatographic separation of mixtures of gases and vapours with the help of circulation chromatographic scheme. A portion of the mixture to be separated is introduced in the flow of an inert carrier-gas into the system from two switched-on columns connected in series switching sequence of which is changed in reverse each time when the portion of the mixture passes from one column to another by which circulation of the chromatographic band in the system of columns is achieved. In the process of circulation of the chromatographic band during its transition from one column into another each time a fresh portion of the mixture is introduced into the middle section of the chromatographic and beginning from the moment a summary width of the chromatographic band on the layer of a sorbent is equal to the length of the chromatographic column, the taking of the separated fractions of the mixture from the ends of the chromatographic band begins. The disadvantage of the known method is that the introduction of the mixture into the flow of the carrier-gas running through the system of chromatographic columns is effected periodiically in form of short pulses. This reduces the efficiency of separation process and results in sudden pressure changes in the gas scheme of the chromatograph each time a new portion of the mixture is introduced which exercises an adverse effect on the efficiency of the chromatographic system and complicates the control of separation.

Moreover, in the known method of separation components of the mixture are moved along the layer of the sorbent only by the action of the flow of the inert carrier-gas. This results in that the separated fractions are diluted considerably with an inert gas which in its turn entails the increase of power consumption for separation of the product from the carrier-gas and for separation as a whole.

Known in the art is a method for continuous separation of mixtures of gases and vapours by a circulation chromatographic scheme. Introduction of the mixture to be separated is effected continuously into one of the last columns on the way of the carrier-gas, and a shift of the point of introduction of the mixture along columns placed in series is effected simultaneously with switching of inlet and outlet points of the carrier-gas. Simultaneously the layer of the sorbent in front of the inlet point of the mixture is heated and the shift of the zone of sorbent heating is effected in synchronizm with the shift of inlet and outlet points of gas flows.

The disadvantage of this method is that temperature change is within certain limits due to thermal inertia which in its turn limits the rise of efficiency and necessity of periodic heating and cooling of separate parts of the gas line complicates considerably the design in which the method is realized.

Known in the art are methods and devices for continuous chromatographic separation of mixtures of gases and vapours into two fractions with the use of a moving layer of a sorbent (Patents of Great Britain No. 887.293; cl.B01 d 53/00 and No. 1.114.596; cl.B01 d).

According to Patent No. 114.596 a chromatographic column is rotated and inlet and outlet paths of gas flows are immovable. For regeneration of the column from the heavy (more sorbing) fraction the programming of temperature of the regeneration section is used. This is realized by that the column is washed by one gas flow in the direction opposite to rotation of the column. The flow is introduced between outlet points of separated fractions (from the opposite side to the inlet point of the mixture), the trend of the flow is ensured by the closure of the column between points of the carrier-gas inlet and of the light fraction outlet. The closure of the column is effected through switchoff of the section of the column between the mentioned points. For increase of rate of disorption of the heavy fraction temperature changing and controlling means of the regenerating section are used. The whole system of columns in general is kept at two different temperatures with repetitive heating and cooling of its separate parts. The minimun number of column sections is eight, valves for inlet and outlet of gas flows are located along the whole length of the column section.

However, the known methods and devices of continuous chromatographic separation of fluid mixtures possess a series of design disadvantages of which mutual sliding surfaces shall be noted in the first place reliable sealing of which is difficult.

The object of the present invention is elimination of the abovementioned disadvantages.

The main object of the present invention is creation of such a device and method of separation of the fluid mixture of substances into fractions in a chromatograph in which a loop of chromatographic columns and inlet and outlet systems of the fluid medium eliminate the use of sliding surfaces and increase the efficiency of mixture separation.

The object of the present invention is creation of such a device and method of separation of the fluid mixture of substances into fractions in a chromatograph which increase the efficiency of separation.

Another object of the present invention is creation of such a device and method of separation of the fluid mixture of substances into fractions in a chromatograph in which there are no sliding surfaces.

Still another object of the present invention is creation of such a device and method of separation of the fluid mixture of substances into fractions in a chromatograph which provide a constant temperature of all chromatographic columns.

Still another object of the present invention is creation of such a device and method of separation of the fluid mixture of substances into fractions in a chromatograph chromatographic columns of which possess a minimum number of sections.

The object is realized by that in the device for separation of the fluid mixture into fractions in a chromatograph comprising chromatographic columns connected in series into a closed loop and paths for inlet of carrier-gas and the mixture to be separated, and for outlet of separated fractions, according to the invention, the loop of chromatographic columns is adapted for passing simultaneously of two independent flows of the fluid medium through separate located in series sections, at least one section being composed of at least two stages, at transition between said stages being an inlet for the mixture to be separated, fluid paths at inlets and outlets of stages of the loop of chromatographic columns and transition paths between them being connected with a switching multipositional device in such a manner that by switching the device into each following position at least one stage of the section is switched into the line of the next section of the chromatographic loop, resulting in each following position of the switching device each of said independent flows to pass through a separate section with at least one of stages each time being replaced by a neighbouring one in the loop of chromatographic columns.

Another embodiment of the invention consists in that the said loop consists of three separate column stages with external communications on their ends and with transistions between each other, these communications and transistions having controlled valves connected to a multipositional switching device adapted for periodic switching of said valves so that in each position of this device two column stages are connected into one column section for passing the first independent flow and the second independent flow can be passed through the third column stage, in the following position of the switching device the column formerly blown by the separate second flow becoming last in the flow in the newly formed double-stage section of the loop of chromatographic columns.

The invention according to one of the embodiments can be provided with the source of the fluid mixture to be separated connected to the transition path between the neighbouring column stages of one section, the other section of the loop being connected to the source of the medium supplied for the purpose of regeneration.

Another embodiment of the invention consists in that all column stages are identical in design and sizes and possess similar resistance to the passed medium.

In the mehod of chromatographic separation of the fluid mixture into fractions with the use of the said device, according to the invention, to the transition between two combined column stages of on gas path the mixture to be separated is supplied continuously, to the inlet of the first column stage of the same path the carrier-gas is supplied, and from the putlet of the last column stage of this path a relatively light, less sorbing fraction is brought out, then the first, one the way of the carrier-gas, column stage of the same path is isolated into a separate gas path and together with remained in it relatively heavy, more sorbing fraction is washed with the regeneration flow, the said portion of the heavy fraction remained in the column stage is brought out from the outlet of the isolated column stage and siumultaneously with that the last remained column stage is connected into a common gas path with the formerly isolated column stage ahead of it in the flow of the carrier-gas and the process is repeated.

Another embodiment of the invention consists in that to the inlet of the two-stage section a displacer gas is supplied.

It is expedient that a relatively heavy fraction of the mixture shall be used as a displacer.

In the proposed device for regeneration of the column from a heavy (more sorbing) fraction the programming of the carrier-gas flow rate in the regeneration section is used. This is effected by that the column is washed in succession by two idenpendent gas flows in the direction of "rotation" of the column loop (by rotation is implied a shifting of inlet and outlet points of gas flows in the column loop). The flows are introduced at outlet points of separated fractions from the side clockwise to the rotation of the column, the trend of flows is ensured by the closure of the column between the carrier-gas inlet point and the adjacent to the fraction outlet point.

The particular feature of the proposed method, according to the invention, is that the process of separation of the mixture with the taking of less sorbing components and the taking of more sorbing components are effected by separate gas flows, shifting of inlet and outlet points of which along column stages positioned in series is carried out simultaneously with the shifting of inlet point of the mixture. This allows to run the whole process of chromatographic separation at the same temperature as the intrinsic lower velocity of the rear front of the zone of more sorbing components is compensated by appropriate selection of gas flow rates.

Separation and taking of light fractions in the front zone of the chromatographic band can be effected under the action of the flow of the mixture itself (frontal application of chromatographic method of separation) and separation of the remained in the column filling balanced mixture can be effected by the action of the displacer. The taking of the heavy fractions of the mixture together with the displacer in the end zone of the chromatographic band can be effected by the additional inert gas flow-over.

In the method according to the invention a water vapour can be conveniently used as a displacer which can be easilly isolated from separated substances by condensation.

The proposed method as distinct from the known ones allows for separation of fractions of vapour and gas mixtures not diluted with an inert gas which is of high practical convenience as it eliminates additional power consumption for separation of fraction from the inert gas.

Moreover the use of the displacer allows for control of speed of movement of the rear front of the chromatographic zone irrespective of linear velocity of the front of the light component.

Another distinguishing feature of the proposed method is that a part of the flow of the heavy fraction can be used as the displacer. This makes it possible to reduce the amount of the displacer being used and to decrease the dilution of the heavy fraction of the mixture with an additional gas flow.

Other objects and advantages of the invention will be better understood from consideration of a detailed description of exemplary embodiments thereof, to be had in conjunction with the accompanying drawings, wherein.

Figure 11:
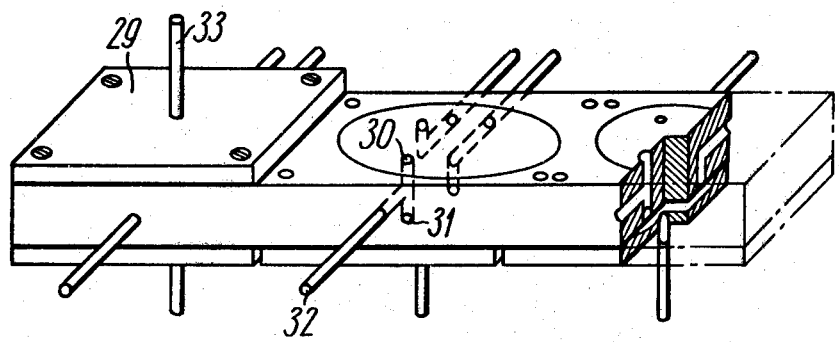

FIG. 11 one version of illustrates the embodiment of the block of switching valves.

The device comprises several, for instance, three chromatographic columns, 1, 2 and 3 connected between each other into a closed loop with the help of transition paths 4, in which controlled switching valves 5, 6 and 7 are positioned, made for instance, as small-sized membrane valves controlled from the commanding device (not shown in FIG.) with compressed air.

Each transition path 4 is provided with supplying gas lines 8 in which similar switching valves 9 are positioned. Gas lines 8 are designed for introduction of gas flows into the system of columns and for outlet of the gas from the system. The number of the gas lines 8 with which each transition 4 is provided is determined by the total number of gas flows introduced into and brought out from the system. When separating the gas mixture into two fractions the number of the said gas lines is five (flows of the mixture to be separated and carrier-gas are introduced into the system and flows of light and heavy fractions diluted with a carrier-gas are brought out from the system). In FIGS. 1–6 the gas lines with valves being in closed position at the given moment and being of little importance for explanation of the process are not shown.

Figure 1:
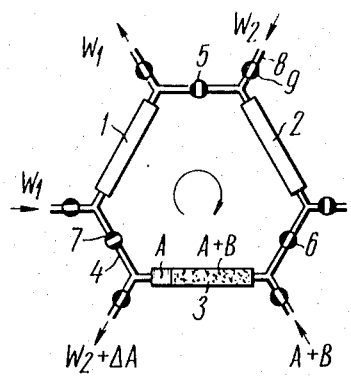
FIGS. 1–6 illustrate several working positions of a gas scheme of one of the versions of embodiment of a chromatographic device, according to the invention.

In the position of the gas scheme of the device, shown in FIG. 1, when valve 6 in the transition path between columns 2 and 3 is open and valves 5 and 7 are closed, into column 1 carrier-gas flow $W_1$ is introduced, which from the outlet of the same column is directed to the collector for the taking of the "heavy" fraction and through columns 2 and 3 carrier-gas flow $W_2$ is passed which from the outlet of column 3 is supplied to the collector of "light" fraction (collectors are not shown in FIGS. 1–6).

Figure 2:
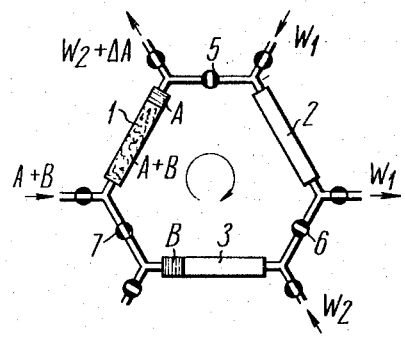
Figure 3:
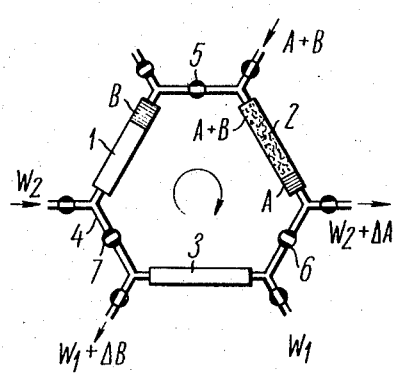
Figure 4:
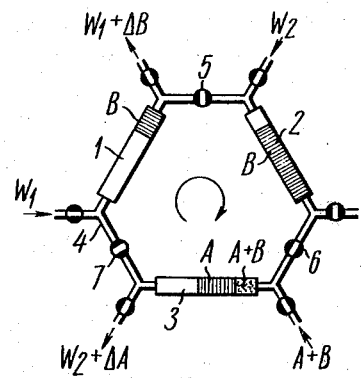
Figure 5:
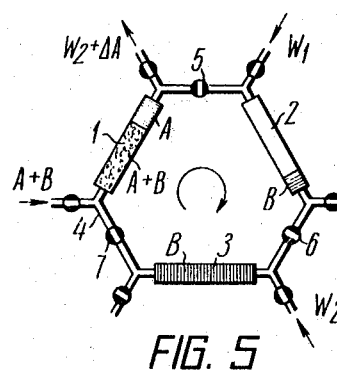
Figure 6:
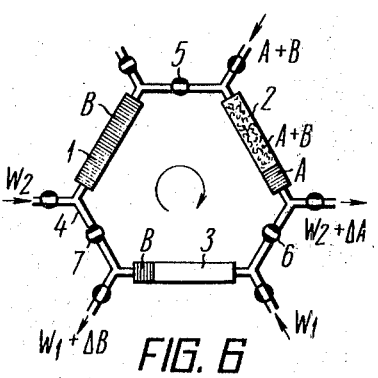

At the beginning of the process of separation at stable carrier-gas flows $W_1$ and $W_2$ into the inlet of column 3 a flow of the gas or vapour mixture is started to be introduced continuously, which contains, for instance, two components A and B, one of which (A) is less sorbing. As the components of the mixture move along the layer of the sorbent in the column 3 the front of the moving chromatographic band due to difference of coefficients of distribution of components starts to be enriched by a light component (A). Beginning from the certain moment $t$ when the front of the chromatographic band reaches the outlet of the column 3, into the light fraction together with the carrier-gas flow $W_2$ the fraction of the mixture enriched mainly by the light component A is supplied. The level of enrichment of the light fraction depends on difference in coefficients of distribution of components in the mixture and on the length of the sorbent layer in the column. Depending on the mixture to be separated and the needed level of enrichment the length of the column and conditions of separation in it (carrier-gas velocity, introduction speed of the mixture and column temperature) are selected. The taking of the light fraction of the mixture from the outlet of the column 3 and supply of the mixture to the inlet of column 3 are carried out to the moment the zone of the chromatographic band containing the mixture of initial consist of components A and B (shaded section A+B of the column in FIG. 1) approaches the outlet of column 3. At that moment the gas scheme is switched to the position shown in FIG. 2 in which valve 7 in the transition path between columns 3 and 1 is open and valves 5 and 6 are closed. At the same moment simultaneously a shift of inlet and outlet points of the carrier-gas flow and the point of inlet of the mixture is effected by switching of valves 9 positioned on the gas lines 8. Beginning from that moment the supply of carrier-gas flow $W_1$ is effected to the inlet of the column 2, the flow $W_2$ — to the inlet of the column 3 and the mixture to be separated is continuously supplied to the inlet of column 1. Taking out of gas flows in the position of the scheme shown in FIG. 2 is effected from the outlet of columns 1 and 2. The process of separation running in this position of the scheme in the column 1 is completely identical to the process described above running in the column 3 during preceeding interval of time. The portion of the mixture remained in the column 3 is washed by the carrier-gas flow $W_2$ from the column 3 to the column 1. Here with the end zone of the chromatographic band moving in the column 3 starts to be enriched by component B of the mixture possessing a higher sorbing capacity. It should be noted that at the similar carrier-gas velocity the linear speed of movement of the starting front of the combined zone A+B equals to the linear velocity of the heavy component B and linear movment velocity of the end front of this zone equals to the velocity of the light component A. However, as through the column 3 the carrier-gas flow $W_2$ is running and through the column 1 the same flow together with the flow of the mixture to be separated is running, the less velocity of the rear front of the combined zone A+B relative to velocity of the light component A, the greater the difference between gas velocities in both columns. Consequently to achieve the maximum efficiency under the particular conditions it is necessary to select the ratio between the mixture carrier-gas flow $W_2$ so that to the moment of approach of the starting front of the combined zone A+B (shaded area A+B in FIG. 2) to the outlet of the column 1, the rear front of the combined zone A+B left completely the column 3 and entered the column 1, and has only the zone B of the chromatographic band enriched by the heavy component is remained in the column 3. When the starting front of the combined zone A+B approaches the outlet of the colump 1 and the rear front of the zone leaves the column 3 the gas scheme of the chromatograph is switched from the position in FIG. 2 into the position of the scheme the valve 5 between columns 1 and 2 is open and valve 6 and 7 are closed. From the same moment the carrier-gas flow $W_1$ is supplied to the inlet of the column 3, the flow $W_2$ — to the inlet of the column 1, and the mixture to be separated is supplied continuously to the inlet of the column 2. A part of the chromatographic band remained in the column 3 which represents the zone enriched by the more sorbing component B will be washed out together with the carrier-gas flow $W_1$ to the collector of the heavy fraction of the mixture. Here the speed of the carrier-gas flow $W_1$ is selected so that to the moment of the following switching of valves the sorbent in the column 3 would be regenerated completely from the component B. The taking of the light fraction of the mixture from the outlet of the column 2 is carried out to the moment the starting front of the combined zone A+B of the chromatographic band approaches the outlet of the column 2 and the rear front of the zone leaves completely the column 1 after which the gas scheme of the chromatograph is switched from the position shown in FIG. 3 into the position shown in FIG. 4. In this position of the scheme the carrier-gas flow $W_1$ is supplied to the inlet of the column 1 and washed out from the outlet of the same column together with the part of the chromatographic band remained in the column 1 enriched by the heavy component B to the collector of the heavy fraction. The carrier-gas flow $W_2$ is supplied to the inlet of the column 2, the mixture to be separated is conducted to the inlet of the column 3 and the taking of the light fraction is effected from the outlet of the column 3. From that moment on the cycles are repeated in the sequence described above. Here with separation of the continuously introduced mixture and the collecting of the light fraction are effected by one carrier-gas flow and the taking of the heavy fraction is carried out with the help of another gas flow, the inlet and outlet points of which are shifted in synchronizm with the switching of the inlet point of the mixture along the columns positioned in series.

The following is another embodiment of the chromatographic device.

Figure 7:
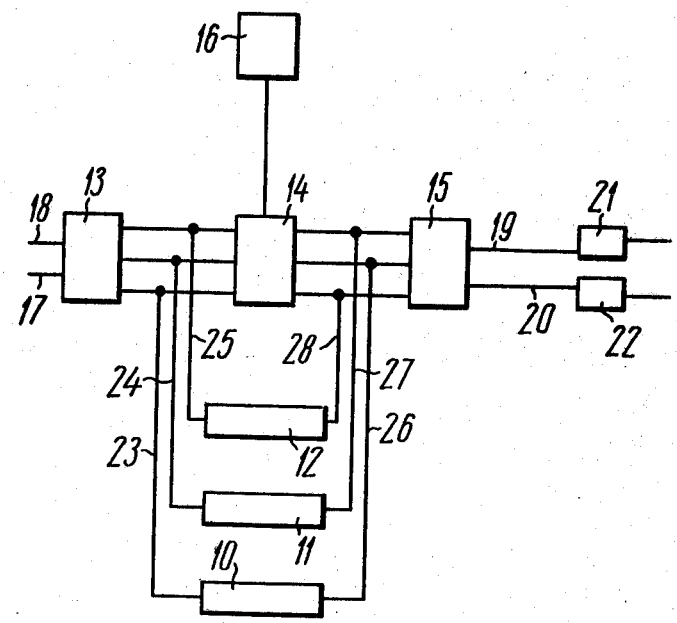
FIG. 7 illustrates a block-diagram of one of the embodiments of a chromatographic device.

The device comprises several, for instance, three groups of separation columns 10, 11 and 12 (hereinafter referred as columns 10, 11 and 12), three groups of switching devices 13, 14 and 15, inlet device 16 of the mixture to be separated, two gas inlets 17 and 18 and two paths 19 and 20 for taking the separated fractions out of system, provided with detection devices 21 and 22 and leading to collectors (not shown in FIG. 7). The presence of detecting devices in both said paths is not necessary and depends on particular conditions.

The group of switching devices 13 connect the gas inlets 17 and 18 to the inlets 23, 24 and 25 of corresponding columns 10, 11 and 12, the group 14 connects the inlets 23, 24 and 25 and outlets 26, 27 and 28 between each other and to the inlet device 16 of the mixture, and group 15 connects column outlets 26, 27 and 28 to paths 19 and 20.

Each group of switching devices 12, 14 and 15 is made in form of a block of pneumatic membrane valves 29 (FIG. 11), gas paths 30 and 31 which from one side of the valves are connected in pairs to the common outlet channel 32 of the corresponding pair. The number of pairs of membrane valves equals to the number of group of columns. At three groups of separation columns the number of membrane valves 29 in each block is six. Each block 13, 14 and 15 has three outlets on one side and six outlets on the opposite side. In FIG. 11 two-membrane valve covers are not shown and the case is shown partially in section. Control pressure of valves 22 is supplied to the cavity between the covers and the membranes through paths 33 connected to the controlling device (not shown in FIG. 11). The valves are open under the effect of pressure in the controlled gas lines pressure upon the membranes being switched off.

Type and connection scheme of detecting devices 21 and 22 depend on particular conditions and are beyond the scope of the present invention. Generally a flame ionization detector can be used.

In the separation method, according to the invention, the detector does not inform about the consist and purity of the separated fraction but inducates the stability of the separation process only. It is possible to carry out the superation without switching on the detectors. As a device for inlet of the mixture to be separated any known design can be used which ensures the supply of gas or vapour mixture to the system at constant volume velocity.

The operation of the device is as follows. The carrier-gas flow introduced through inlet 18 into the device in the position of the scheme shown in FIG. 8, flows through block of valves 13 and path 23 to the separation column 10 and therefrom through path 26 to the block of valves 14 where to the carrier-gas flow is added the flow of the mixture to be separated from the mixture in let devvice 16. Then, the total carrier-gas flow and the mixture to be separated pass through the path 24 to the column 11 and leaves it through path 27, block of valves 15 and path 20 with the detection device 22 to the collector of the light fraction (not shown in FIG. 7). Here with the front of the mixture running in the column 11 starts to be enriched by lighter component of the mixture which beginning from a certain moment when the front of the chromatographic band has reached the outlet of the column 11, enter together with the carrier-gas the collector of the light fraction. At the same time a zone of the chromatographic band remained in the column 10 after precceeding switching is washed by the carrier-gas from the column 10 through block of valves 15 to the column 11, herewith its end zone starts to be enriched by the heavier component of the mixture. The conditions of selection are to be taken so that to the moment the combined zone of the chromatographic band approaches the outlet of the column 11, its end front has already left the column 10 in which only the zone of the chromatographic band enriched by the heavier component is remained.

The zone of the chromatographic band remained in the column 12 after preceeding switching of the scheme enriched by the more sorbing component is washed out from the device by the second carrier-gas flow which is supplied through the inlet 17 and passes through the block of valves 13, path 25, column 12, path 28 and the block of valves 15 to the path 19 with the detecting device 21 and then to the heavy fraction collector. The speed of this carrier-gas flow is selected in such a way that to the moment of the following switching of the scheme the sorbent in the separation column 12 has been completely regenerated.

Figure 8:
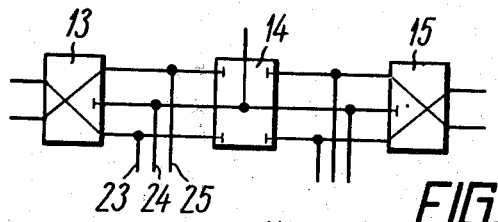
FIGS. 8–10 illustrate connections between elements of FIG. 7 in three successive positions.
Figure 9:
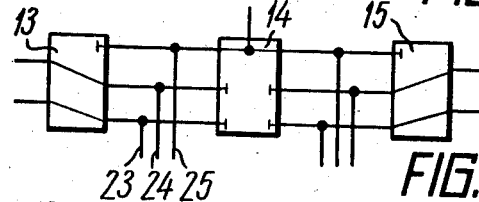

When the front of the combined zone of the chromatographic band approaches the outlet of the column 11, the device is switched from the position shown in FIG. 8 into the position shown in FIG. 9.

Figure 10:
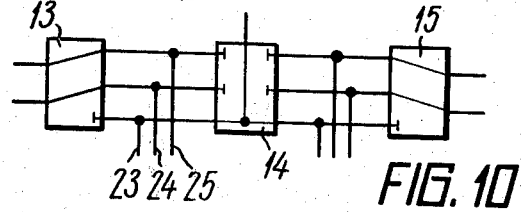

The carrier-gas flow of the gas-carrier supplied through the inlet 18 passes through columns 11 and 12, the mixture to be separated is supplied to the inlet of the column 12, the taking of the light fraction is effected from the outlet of the column 12, and the zone of the chromatographic band remained in the column 10 and representing the heavy fraction is washed out by the carrier-gas flow supplied through the inlet 17. When the starting front of the combined zone of the chromatographic band approaches the outlet of the column 12 the device is switched from the position shown in FIG. 9 to the position shown in FIG. 10 and the process goes on in the abovementioned sequence. Here with the separation of the continuously supplied mixture and collecting of the light fraction are effected by one carrier-gas flow supplied through the inlet 18 and collecting of the heavy fraction is effected by another gas flow, supplied through the inlet 17, the inlet and outlet points of which are shifted in synchronizm with the switching of inlet points of the mixture along the columns positioned in series. The taking of the light fraction is effected during a certain interval of time preceeding immediately the moment of switching of the device and the taking of the heavy fraction takes place within the interval of time immediately going after the moment of switching. Both fractions can represent least or most sorbing component of the mixture with a certain level of enrichment or the mixture of less or more sorbing components (in multi-component mixtures), depending on conditions and objects of particular task.

Instead of the carrier-gas through the inlet 18 a displacer can be supplied which can be presented either by gases sorbing capacity of which exceeds the sorbing capacity of the most sorbing component of the mixture to be separated, or by vapours of liquids, for instance of water. The ratio of flows of mixtures and the displacer is selected in such a way that separation of the mixture and the taking of the light fraction in the front zone of the chromatographic band are effected under the action of the mixture itself, and separation of the mixture of initial consist remained in the filling of the preceeding column is effected under the effect of the displacer.

What is claimed is:

1. A method of chromatographic separation using at least three chromatographic separating columns connected in a circulation loop, each column during a plurality of cycles successively acting as an enriching column as a stripping column and as a regenerating column, the steps for each cycle comprising: continuously introducing the mixture to be separated at constant flow rate into a pipe for connecting the stripping column to the enriching column; recovering a fraction of the mixture enriched in more strongly adsorbed components at the outlet of the regenerating column; recovering a fraction of the mixture enriched in less strongly adsorbed components at the outlet of the enriching column, the separation and recovering of the fraction enriched in less strongly adsorbed components being carried out by means of a first carrier gas stream, the recovering of the fraction enriched in more strongly adsorbed components and regeneration of the separating column being carried out by means of second carrier gas stream; shifting of the inlet point of the mixture and the inlet and outlet points of the carrier gas streams along the columns in the direction of gas flow periodically and simultaneously, each time the inlet of the separating column previously regenerated being connected to the outlet of the separating column into which formerly the mixture was introduced, the duration of the cycle between two successive shiftings of gas streams, the introducing rate of the mixture to be separated and carrier gas flow rate into the stripping column being related so that at the moment of the subsequent shifting of gas streams when more adsorbed components to be removed from the outlet of a regenerating column have reached the outlet of the enriching column less adsorbed components to be removed from the outlet of an enriching column have already left the stripping column wholly entering the enriching column.

* * * * *